United States Patent [19]

Fergusson

[11] 4,004,904

[45] Jan. 25, 1977

[54] ELECTRONIC SYSTEM FOR ARTICLE IDENTIFICATION

[75] Inventor: Robert Thomas Fergusson, Denver, Colo.

[73] Assignee: Index, Incorporated, Denver, Colo.

[22] Filed: Aug. 4, 1975

[21] Appl. No.: 601,905

[52] U.S. Cl. .................................... 65/158; 65/29; 65/DIG. 13; 235/92 PD; 235/151.1

[51] Int. Cl.[2] .......................................... C03B 9/40

[58] Field of Search ............... 65/29, 158, DIG. 13; 235/151.1, 92 PD

[56] References Cited

UNITED STATES PATENTS

| | | | |
|---|---|---|---|
| 3,745,314 | 7/1973 | Mathias et al. .................... | 65/29 X |
| 3,762,907 | 10/1973 | Quinn et al. .............. | 65/DIG. 13 X |
| 3,905,793 | 9/1975 | Croughwell ................ | 235/151.1 X |

*Primary Examiner*—Arthur D. Kellogg
*Attorney, Agent, or Firm*—O'Rourke, Harris & Hill

[57] ABSTRACT

A system is disclosed for identifying articles emanating in a predetermined sequence from a plurality of sources and formed into rows prior to conveyance to an identification area. The system is particularly useful for identifying glass bottles and, more particularly, for remote marking of defective glass bottles that emanate from glass forming molds so that the defective bottles can be later separated from acceptable ware. The electronic system utilized generates a series of pulses corresponding to formation of each row of bottles to be conveyed and these pulses are coupled to a shift register used for signal delay with the shift register also receiving pulses that are timewise related to the rate of row conveyance. The delayed pulse output from the shift register is coupled through a delay selector switch and fine adjust delay so that the pulse output is delayed a time equivalent to that required from formation of each conveyed row until that conveyed row arrives at the marking, or identification, area.

23 Claims, 2 Drawing Figures

ELECTRONIC SYSTEM FOR ARTICLE IDENTIFICATION

FIELD OF THE INVENTION

This invention relates to an electronic system for article identification and, more particularly, relates to a system for remote marking of defective glass bottles after said bottles have been formed into rows.

BACKGROUND OF THE INVENTION

It is oftentimes desirable, and in many instances necessary, to identify particular articles in a group of articles. This can present a problem where the articles are repositioned during conveyance from a single line to row conveyance, for example. In addition, where the articles are emanating from a plurality of sources, the problem of identifying articles from a particular source after formation of the articles into rows for conveyance further complicates the problem.

Where the articles can be conveniently identified at the source, there is, of course, no problem unless the identification is later lost during conveyance of the article. It is not always convenient, or even practical, however, to mark an article at the source for later identification after conveyance. Such is the case, for example, in the manufacture of glass articles, such as glass bottles, where the glass is quite hot when it emanates from the glass forming molds. Such articles are commonly conveyed from the forming machine to a lehr belt for conveyance through the lehr in rows. It is at this point that identification and culling of defective bottles can be achieved. Where it is desirable that defective bottles emanating from a particular mold or molds be marked or otherwise identified, such marking has heretofore presented a problem that prior known systems have been unable to completely solve.

SUMMARY OF THE INVENTION

This invention provides a system for identification of articles, and, more particularly, for identification of articles from a plurality of sources after said articles have been formed into rows for conveyance. The system is particularly useful for identifying defective glass bottles after said bottles have left the forming molds and positioned into rows for conveyance purposes.

It is therefore an object of this invention to provide a system for identifying articles.

It is another object of this invention to provide a system for identifying articles after said articles have been formed into rows for conveyance.

It is still another object of this invention to provide a system for identifying articles emanating from one or more particular sources with the articles being formed into rows prior to identification.

It is yet another object of this invention to provide a system for identifying glass bottles emanating from forming molds and positioned into rows for conveyance purposes.

It is still another object of this invention to provide a system for identifying glass bottles emanating from forming molds and position into rows prior to identification.

It is still another object of this invention to provide a system for marking glass bottles.

It is yet another object of this invention to provide a system for marking defective glass bottles from one or more forming molds and positioned into rows prior to marking.

It is another object of this invention to provide a system for marking defective glass bottles and separating marked defective bottles.

It is still another object of this invention to provide a system for identifying articles emanating from a predetermined plurality of sources and formed into rows prior to conveyance to an identification area with the system including signal generating means for generating an output signal indicative of row conveyance of articles to the identification area, first means connected with a signal generating means and providing an output signal indicative of articles within the conveyed rows, second means connected with the first means and providing an output signal indicative of the sources from which said conveyed articles emanate, and identifying means at the identification area receiving the output signals from the first and second means and responsive thereto providing an identification with respect to source of articles in the conveyed rows.

With these and other objects in view, it will become apparent to one skilled in the art as the description proceeds, this invention resides in the novel construction, combination, and arrangement of parts substantially as hereinafter described, and more particularly defined by the appended claims, it being understood that such changes in the precise embodiment of the hereindisclosed invention are meant to be included as come within the scope of the claims.

BRIEF DESCRIPTION OF THE DRAWINGS

The accompanying drawings illustrate a complete embodiment of the invention according to the best mode so far devised for the practical application of the principles thereof, and in which.

DESCRIPTION OF THE INVENTION

Figure 1:
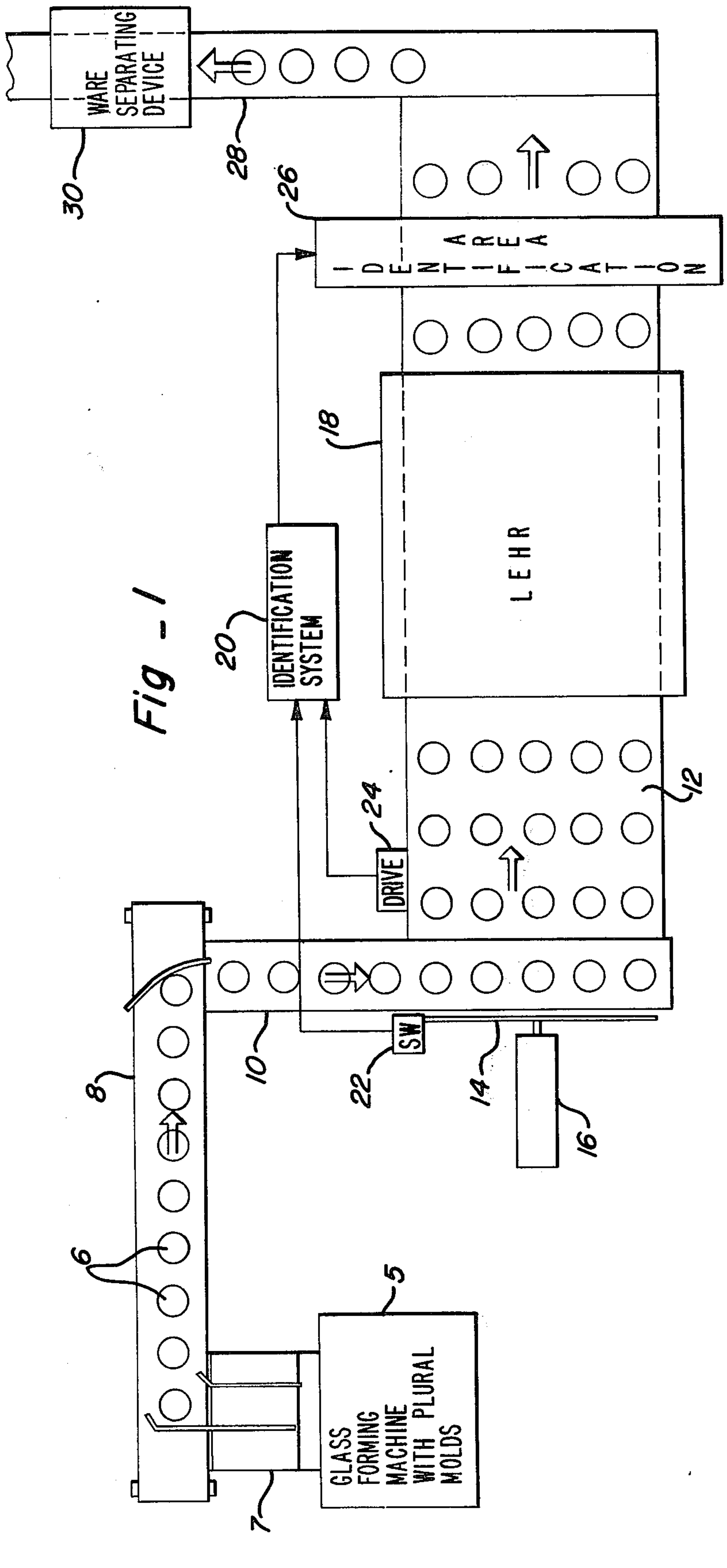
FIG. 1 is a partial top view and flow diagram illustrating a typical glass forming and handling machinery with the system of this invention utilized in conjunction therewith.

Referring now to the drawings, the numeral 5 indicates generally a glass forming machine having a plurality of forming molds utilized therein. Glass forming machines, such as the conventional IS (Individual Section) machine, are well-known and commonly sequentially produce glass articles 6 from a plurality of molds in predetermined succession, with each glass article being moved to a common dead plate 7 from where the glass articles, such as bottles, are moved onto conveying belt 8 while quite hot. Thus, if eight forming molds are utilized, each mold will produce every eighth bottle that is moved onto belt 8. While not shown, other glass forming machines can also provide bottles to belt 8 in determinable fashion.

As shown in FIG. 1, the bottles 6 are conveyed in single file by one or more belts, such as belt 10, to a lehr belt 12 where the bottles are urged by sweeper arm 14, driven by drive 16, from belt 10 to the lehr belt in rows. Lehr belt 12 is conventionally quite wide to receive a plurality of bottles in rows so that the bottles are conveyed in rows through lehr 18.

At this point, it is desirable to be able to identify particular bottles, such as defective bottles coming from one or more of the forming molds. The system of this invention is well suited for that purpose. As indicated in FIG. 1, identification system 20 receives an input from switch 22 activated by sweeper arm 14 and a second input from a lehr drive 24 which determines the rate at which bottles are conveyed in rows. The identification system thus provides an output to the identification area 26 where particular bottles are identified and/or marked as brought out more fully hereinafter.

As also indicated in FIG. 1, the bottles 6 on lehr belt 12 are conventionally later removed from the belt and transferred to belt 28 in single file. While on belt 28, the bottles may be inspected and defective bottles separated by defective bottle separating means 30 utilized to separate defective bottles from acceptable ware as is well-known.

It is to be realized that the glassware forming and handling machinery is meant to be illustrative only and this device is not meant to be limited thereto.

Figure 2:
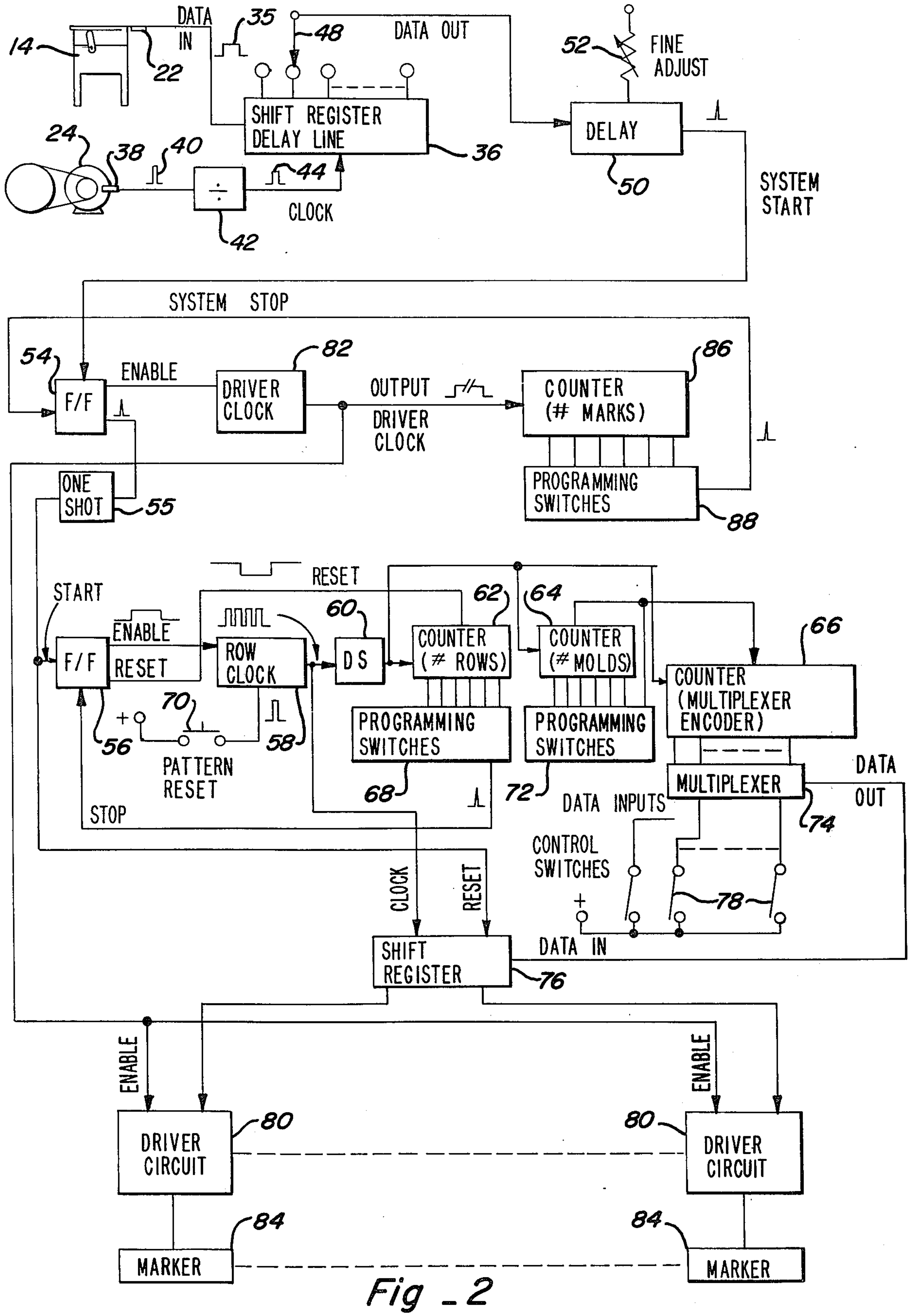
FIG. 2 is a block diagram of the system of this invention shown utilized in FIG. 1 in conjunction with a glass forming and handling machinery.

Referring now to FIG. 2, the system of this invention is set forth in block diagram form. As illustrated, switch 22 is actuated by movement of sweeper arm 14 so that a series of pulses 35 are generated with one pulse being generated for each conveyed row of bottles transferred to belt 12. The pulses thus generated are coupled as the data input to shift register 36.

The second input to the shift register 36 is a clock pulse input generated from a pick-up 38 at lehr belt drive 24. The pulses 40 generated are thus related to the rate of row conveyance of bottles. If desired, the pulses can be divided by divider 42 into a more desired number of pulses 44 to achieve the delay needed, such delay being the time necessary for conveyed rows of bottles to be moved from where formed into rows to the identification area.

A delay selector switch 48 has a movable contact to enable selection of delay in conventional manner by being brought into engagement with the fixed contacts providing the needed output from the shift register. The delayed pulse ouput (data out) is coupled through an additional delay device 50 having a potentiometer 52 providing fine adjustment to assure the proper delay for the data out signal.

The delayed pulse output from delay line 50 is coupled to bistable multivibrator (F/F) 54 as the system start signal. One output from F/F 54 activates one-shot 55 which is coupled to bistable multivibrator (F/F) 56, the output from which enables row clock 58.

The pulse output signal from row clock 58 is coupled through a digit selector 60 to row counter 62, mold counter 64 and multiplexer encoder counter 66. Row counter 62 has programming switches 68 connected therewith so that when the row counter 62 has received a number of pulses equal to the number of bottles in a conveyed row, a stop signal is coupled back to F/F 56 to stop the row clock 58. F/F 56 also provides a reset signal to row counter 62 as indicated in FIG. 2, and a pattern reset switch 70 is also provided to increment row counter 62, mold counter 64, and multiplexer encoder counter 66 by increments of one.

Mold counter 64 has programming switches 72 connected therewith so that said mold counter is reset when a number of pulses has been received at the mold counter equal to the number of forming molds being utilized to form the bottles. Multiplexer encoder counter 66 also receives a reset from programming switches 72 and is reset along with mold counter 64.

Multiplexer encoder counter 66 has a multiplexer 74 connected therewith providing a data output pulse signal to shift register 76. Data inputs to multiplexer 74 are provided by control switches 78. There is a control switch for each forming mold so that when a defective bottle is noted from a particular mold, the corresponding control switch is positioned to the closed position for later identification or marking of each succeeding bottle from that mold until the problem is corrected and the forming mold is no longer producing defective bottles.

Shift register 76 receives a clock pulse input from row clock 58 and a reset pulse input from F/F 54 through one shot 55. The outputs of shift register 76 are conventionally timewise spaced and each output is connected with a driver circuit 80, each of which driver circuits also receives an enable input from driver clock 82 connected with F/F 54. Each driver circuit 80 is connected with a marker 84 when identification is to be done by marking the bottle, as by ink, for example. Driver circuit 80 could of course directly activate means for removing the bottle, but use of marker 84 is preferred to avoid the complexity of a second removal means when most glass production lines include inspection means with such removal means. Removal of a specific bottle constitutes but another form of identification of the bottle.

Driver clock 82 has its output connected with marks counter 86 which in turn is connected with programming switches 88. Programming switches 88 provide a system stop output to F/F 54 and controls, or determines, the number of marks to be put on each marked bottle.

In operation, switch 22 is momentarily closed as each conveyed row of bottles is placed on belt 12 at the conclusion of the "hot" manufacturing process of the glass bottles. All succeeding rows follow the same mold pattern, i.e., if there are eight different molds in the particular manufacturing process, then eight subsequent bottle rows follow the same mold order as the first eight bottles. Closing of switch 22 initiates a pulse to the data input of conventional shift register 36. The application of a clock pulse 44 stores a binary 1 bit in the first position of the shift register. Each succeeding clock pulse then shifts the bit one position within the shift register, as is conventional.

The shift register clock frequency, which enables the shift register, is derived from the velocity of the lehr belt 12 (or the belt speed of any conveyer that carries the bottle rows if not a lehr belt). Since for different applications the speed of the conveyor may vary, it is necessary to calculate for the particular application the number of clock pulses required to shift the binary 1 in the shift register before the conveyed row of bottles arrives at the marking area (which may include a daubber bar for example) where the rows of bottles will be identified.

If the shift register 36 contains a maximum of 4,200 bit positions, for example, the best utilization of all bit positions, regardless of the speed of the conveyor, is to assume that approximately 3,900 clock pulses are required before the conveyed rows of bottles reach the marking area, which allows for sufficient tolerance of 300 pulses if the actual working practice shows that this estimate was low. The actual or real time required before the rows reach the identifying, or marking, area from row formation (or where switch 22 is activated) is measured.

Division of the estimated 3,900 pulses by this time measurement provides the desired clock rate of the shift register. Divider circuit 42 then provides the circuitry for receiving a clock signal from the drive section 24 of the lehr belt and divides this clock signal such that the approximate desired shift register clock rate is produced. This number of pulses is preset manually such that after this tapped number of shifts has been completed, a signal will be outputted from the shift register and the identification process can begin. Once the number of clock pulses has been manually set on the switches, no further adjustment is necessary. If the lehr belt speed should decrease or increase, the shift register clock will output at a proportional rate and thus automatically adjust for the needed delay.

In addition to this manual setting of the shift register for the required number of clock pulses, a fine time delay adjustment is provided by delay 50 and potentiometer 52 which corrects for small differences in time between the calculated and actual values of time before the conveyed rows of bottles reach the identification area.

After the needed delay has been established, the output signal enables two separate clock frequency circuits. Along one electrical path, an oscillator circuit (Driver Clock 82) is enabled. The clock frequency output of driver clock 82 is coupled to marks counter 86, preferably a binary coded decimal (BCD) counter. At the completion of the interrogation of all control switches 78, the clock pulses from driver clock 82 will continue to input to marks counter 86 until the number of clock pulses equals the number manually stored in the programming switches and this is the number of times the bottle will be marked.

The delayed pulse signal from the shift register 36 also enables another oscillator circuit (rows clock 58), which ultimately sends a clock pulse along four different signal paths. One of these signal paths branches to three separate increment counters 62, 64, and 66, the clock pulse being coupled thereto through driver select 60 (a 4-bit divide-by-N counter, where N equals a whole number). Depending on the numerical value programmed into the digit select counter, the output to counters 62, 64, and 66 (binary-type counters) will be divided by the number of clock pulses represented by the entry programmed into the digit select counter. If a whole number fraction of the maximum number of markers is to be utilized, for example, then the digit control is set for that number, i.e., if the number of glass bottles to be identified is only one half the maximum number that can be identified, then only every other marker could be used. Each succeeding control switch 78 is interrogated until all forming molds have been checked, but the shift register 76 input to the markers could, in this example, be shifted twice for each clock pulse that interrogates a control switch. This allows for the marking of larger size bottle mouths, for example, by shifting a binary 1 bit to that position in the shift register corresponding to every other marker of the maximum number available. If the number of markers equals the number of forming molds, then the driver select is set at unity. Each clock pulse then increments each of the three counters 62, 64, and 66.

Rows counter 62 is a binary coded decimal counter in order to conform to the decimal quantity set in programming switches 68. This conventional BCD counter continues to receive clock pulses until the number in the counter equals the value entered in the programming switches 68. Once this quantity is reached, all bottles in a particular row have been interrogated and the clock pulses stop until the next conveyed row of bottles move to the identification area and the process then repeats itself.

Mold counter 64 is also a BCD counter. Each clock pulse increments this counter by one until all forming molds have been checked. The number of forming molds is stored in the programming switches 72 and the BCD counter 64 is reset once this quantity is reached.

The third counter 66 is a binary counter that increments to the same value as the mold counter 64 but in binary increments rather than through binary coded decimal. Although a BCD counter could be used, a binary counter is possible because there is no corresponding decimal equivalent set in programming switches and therefore, no specific limitation on the kind of counter that may be employed. Multiplexer encoder counter 66 increments in a binary fashion until all control switches, corresponding to the total number of forming molds as established by programming switches 72, have been interrogated. When this occurs, counter 66 will be set to zero using the same reset signal applied to the BCD mold counter 64.

For each clock pulse, the multiplexer encoder counter 66 increases its count by one and the output of the counter is gated to a conventional multiplexing circuit 74. The multiplexing operation outputs a single binary 1 or 0 for each count representing one control switch 78 (which may be on the front panel of the equipment). If one or any number of control switches have been activated, a binary 1 will then cause an output from the multiplexing circuit whenever the binary counter corresponds to that particular control switch. When the binary counter indicates a switch not activated, the output is a binary 0. This output signal, either a binary 1 or 0 representing an activated or unactivated control switch, respectively, is coupled to conventional shift register 76.

The clock frequency from row clock 58 is also applied to shift register 76 and thereby enables the binary bit output of the muliplexing operation to be gated into the shift register. Again a clock pulse continues to gate the binary data for every control switch 78 that is being interrogated. The shift register affords a method of positioning the binary 1 bits to enable the appropriate driver circuits 80 that actuates markers 84. For example, if there are twelve forming molds but only ten bottles in a row, the shift register movement from left to right enables any binary 1 bits to be positioned so as to be applied to the proper driver circuits which are electrically connected to the shift register 76 from right to left.

At the conclusion of the interrogation process of all bottles in a conveyed row, the binary bits in the shift register are gated to the driver circuits when the clock pulse from the driver clock reaches the gate and enables the driver circuits. Thus, only driver circuits connected to the shift registers outputting a binary 1 will be caused to actuate markers associated therewith. The marker so actuated will mark the bottle the number of times stored in the programming switches 88 associated with counter 86. The marked bottles are then rejected at defective bottle separator device 30, such as, for example, an automated device checking for such marked bottles. If no such device 30 exists, the bottle could of course be removed at identification area 26.

From the foregoing, it can be appreciated that this invention provides a novel system for remote identification of articles.

What is claimed is:

1. A system for identifying specific articles amongst a group of articles, the specific articles emanating from at least one predetermined source amongst a plurality of such sources, the articles being produced in a predetermined sequence relative to the sources and formed into rows in which the predetermined sequence is maintained prior to conveyance to an identification area spaced from the row formation area, said system comprising:

signal generating means for generating an output signal indicative of presence of a specific row of articles at said identification area;

first means connected with the signal generating means for receiving said output signal and, in turn, providing output signals each of which is indicative of an article within the specific conveyed row;

second means connected with said first means and providing sequential output signals each corresponding to a signal from the first means and indicative of said predetermined source from which a specific conveyed article emanated; and identification means at said identification area receiving said output signals from said first and second means and responsive thereto to provide an identification of selected articles with respect to a selected source of articles in said conveyed row, whereby the identity of each article of the selected articles relative to the source of the article is preserved when the articles are formed into rows.

2. The system of claim 1 wherein said articles are glass bottles emanating from forming molds and wherein said identification area is adjacent to a conveyor upon which said rows of glass bottles are conveyed.

3. The system of claim 1 wherein said signal generating means includes means providing an output pulse as a part of said output signal in response to formation of each of said rows, said means for generating an output pulse being connected to delay means to receive said output pulse and provide a delayed output signal when the row of articles which intitially generated the output pulse arrives at said identification area, said delayed output signal constituting said output signal indicative of the presence of a specific row of articles at said identification area.

4. The system of claim 3 wherein said delay means includes a shift register receiving the output pulse from said signal generating means, wherein said system also includes pulse generating means providing output pulses having a predetermined relationship with respect to the rate of row conveyance of said articles with said pulse output from said pulse generating means being coupled to said shift register, and wherein said delay means includes switch selector means connected with said shift register to preselect the amount of delay of said output signal coupled to said first means.

5. The system of claim 4 wherein said system includes additional delay means connected in series with said first named delay means, and adjustment means connected with said additional delay means to effect timewise fine adjustment of said delayed output signal.

6. The system of claim 1 wherein said first means includes clock means and first counter means, said first counter means causing said first clock means to produce a series of pulses having a predetermined relationship with respect to the number of articles within each row of conveyed articles.

7. The system of claim 6 wherein said first counter means includes a counter and a plurality of programming switches.

8. The system of claim 6 wherein said first means includes a divider connected between said first clock means and said first counter means for selection purposes.

9. The system of claim 1 wherein said second means includes second counter means, a multiplexer connected with said second counter means, and a plurality of switches connected with said multiplexer, the number of said switches utilized corresponding to the number of sources of said articles to effect said source identification.

10. The system of claim 9 wherein said counter means includes second and third counters with said counters having programming switches connected therewith and said third counter being connected with said multiplexer.

11. The system of claim 1 wherein said system includes driver clock means receiving said output signal from said signal generating means and providing a driver output signal, and wherein said identifying means includes a second shift register receiving said output signal from said first and second means and a plurality of driver circuits connected with said shift register and receiving said driver output signal from said driver clock means for effecting said identification with respect to source of said row conveyed articles.

12. The system of claim 11 wherein said system includes a plurality of markers and wherein each of said markers is controlled by a different one of said plurality of driver circuits to selectively mark articles within said rows with respect to source.

13. The system of claim 11 wherein said system also includes a means connected with said driver clock means for determining the number of marks to be placed on each article by said markers.

14. The system of claim 13 wherein said number of marks determining means includes a fourth counter having a plurality of programming switches connected therewith and controlling the output of said driver clock means.

15. A system for identifying glass bottles emanating from a plurality of forming molds in a predetermined sequence, said bottles being positioned into rows prior to conveyance of such rows to a marking area remote from said forming molds, said system comprising:

pulse signal generating means for generating an output pulse indicative of the presence of each row of bottles conveyed at said marking area;

first means including counter means connected with said pulse signal generating means and providing output signals each of which is indicative of a specific bottle within said conveyed rows;

second means including counter means connected with said first means and selectively providing an output signal indicative of preselected of said molds from which said conveyed bottles emanated; and marking means at said marking area receiving said output signals from said first and second means and responsive thereto providing marking of bottles with each marking being indicative of the particular forming mold from which said bottles emanated.

16. The system of claim 15 wherein said system includes delay means receiving an output upon formation of a row for conveyance and providing said output pulses each pulse of which is timewise delayed until said row of which said pulse is indicative is at said marking area.

17. The system of claim 15 wherein said first means includes programming switches connected with said counter means of said first means, and wherein said second means includes a multiplexer connected with said counter of said second means, and a plurality of switches which relates to a different one of said forming molds.

18. The system of claim 15 wherein said marking means includes a shift register receiving the outputs from said first and second means, a plurality of driver circuits connected to different outputs of said shift register, and a plurality of markers each of which is connected with a different one of said driver circuits.

19. The system of claim 18 wherein said system includes a driver clock an output of which is connected with said driver circuits, and wherein said system also includes marker determining means connected with said driver clock to control the number of marks to be placed on individual bottles by a particular one of said markers.

20. A system for identifying glass bottles emanating in a predetermined sequence from a specific mold among a plurality of forming molds, said bottles being positioned into rows prior to conveyance of such rows to a marking area, said system comprising:

first pulse generating means for generating an output signal the pulses of which have a predetermined relationship with respect to the rate of row conveyance of said bottles;

second pulse generating means for generating an output signal upon formation of a row of bottles and initiation of conveyance thereof;

a first shift register receiving said output signals from said first and second pulse generating means and providing time delayed pulses;

delay selection switch means for selecting the amount of delay of pulses from said first shift register means so that said delay is substantially equal to the time required from formation of said bottles into a row until said row reaches said marking area;

a row clock activated by each pulse from said first shift register and producing output pulses when activated;

a row counter connected with said row clock and receiving the pulses therefrom;

first programming switches connected with said row counter to deactivate said row clock after a predetermined number of pulses having a predetermined relationship to the number of articles in said conveyed rows have been produced by said row counter;

a mold counter activated by said row clock;

second programming switches connected to said mold counter to reset the same after a predetermined number of pulses having a predetermined relationship to the number of forming molds from which bottles emanated have been coupled to said mold counter;

a multiplexer encoding counter activated by said row clock, said multiplexer encoding counter being reset by said second programming switches along with said mold counter;

a multiplexer connected to said multiplexer encoding counter and providing an output signal;

a plurality of control switches connected with said multiplexer, the number of said control switches being equal to the number of forming molds with a predetermined position of each controlling the output signal from said multiplexer to indicate a source from which defective bottles are emanating;

a second shift register receiving said output signals from said multiplexer and said row clock, said second shift register having a plurality of outputs producing timewise spaced output signals;

a driver clock connected with said first shift register to be activated by said delayed output pulses therefrom;

a plurality of driver circuits each of which is connected with a different one of said outputs from said second shift register and with said driver clock whereby each said driver circuit can be individually engaged at different times depending upon the positioning of said control switches; and a plurality of marker means each of which is connected with a different one of said driver circuits whereby said marker means if caused to mark defective bottles at said marking area, said bottles being marked with respect to the forming mold from said which said defective bottle emanated regardless of positioning of the bottle within a particular convey row.

21. The system of claim 20 wherein said system includes a third counter and third programming switches connected with said driver clock to control the number of times each said driven circuit is energized to mark a particular bottle.

22.The system of claim 20 wherein said system includes a first bistable multivibrator connected between said first shift register and said driver clock, and a second bistable multivibrator connected between said first bistable multivibrator and said row clock.

23. The system of claim 20 wherein said system includes means for separating said marked defective bottles.

* * * * *

UNITED STATES PATENT OFFICE
CERTIFICATE OF CORRECTION

PATENT NO. : 4,004,904

DATED : January 25, 1977

INVENTOR(S) : Robert Thomas Fergusson

It is certified that error appears in the above-identified patent and that said Letters Patent are hereby corrected as shown below:

Title Page, change Assignee from "Index, Incorporated" to --Inex, Incorporated--

Signed and Sealed this

Third Day of May 1977

[SEAL]

*Attest:*

RUTH C. MASON
*Attesting Officer*

C. MARSHALL DANN
*Commissioner of Patents and Trademarks*